Oct. 9, 1956 K. C. STROHL 2,765,706
MUZZLE BRAKE
Filed March 6, 1953 4 Sheets-Sheet 1
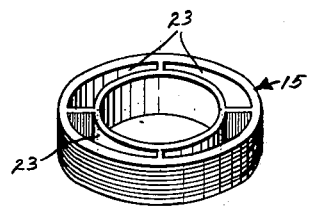
FIG.4
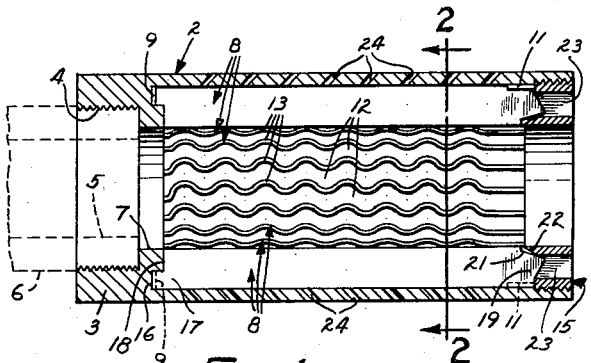
FIG.1
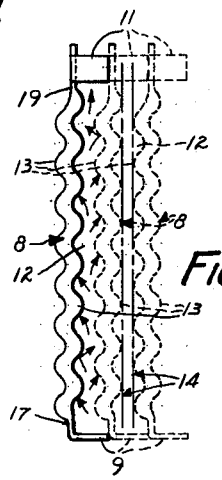
FIG.5
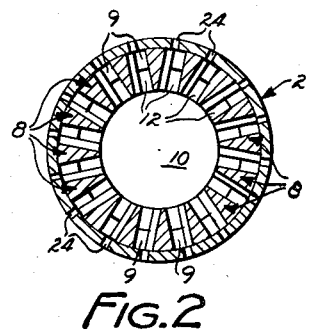
FIG.2
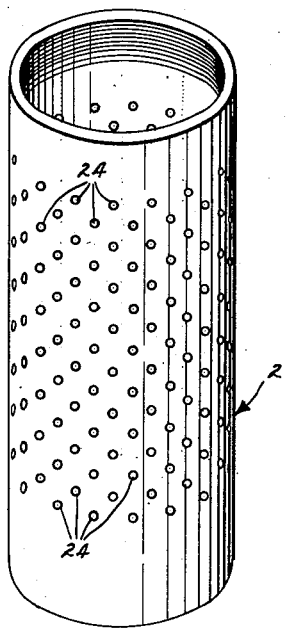
FIG.7
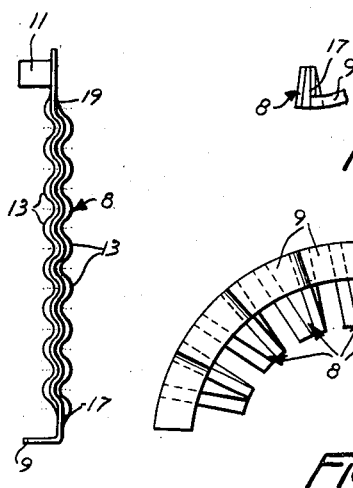
FIG.6
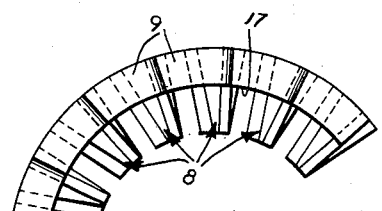
FIG.8
FIG.3
INVENTOR.
KENNETH C. STROHL
BY
Paul, Moore & Dugger
ATTORNEYS Oct. 9, 1956  K. C. STROHL  2,765,706
MUZZLE BRAKE Filed March 6, 1953  4 Sheets-Sheet 2

INVENTOR.
KENNETH C. STROHL
BY
Paul, Moore & Duggin
ATTORNEYS

Oct. 9, 1956   K. C. STROHL   2,765,706
MUZZLE BRAKE

Filed March 6, 1953   4 Sheets-Sheet 4

INVENTOR.
KENNETH C. STROHL
BY Paul, Moore + Dugger
ATTORNEYS

United States Patent Office 2,765,706
Patented Oct. 9, 1956

2,765,706

MUZZLE BRAKE

Kenneth C. Strohl, Fairmont, Minn.

Application March 6, 1953, Serial No. 340,701

9 Claims. (Cl. 89—14)

This invention relates to new and useful improvements in devices for neutralizing the recoil of small fire arms commonly known in the trade as "muzzle brakes," and has for its principal object to provide a device of this character which, when rigidly attached to a gun muzzle, will cause the escaping gases to expand and exert a force in a direction opposite to the recoil force of the gun, thereby to greatly lessen the recoil force against the marksman's shoulder, when the gun is fired.

There are now available on the market various types of muzzle brakes for firing arms, but after a long and extensive survey of the performance of such known devices, I have found that they have not proven entirely satisfactory, first, because of their inability to effectively neutralize or reduce the recoil of the gun blast, and secondly, because most such devices have a tendency to increase, rather than minimize the noise of the gun blast, particularly the side noise, which may be very disturbing to the operator of the gun and thus affect his accuracy of fire.

Some of these known muzzle brakes are so designed as to actually direct a portion of the expanding gases from the gun in a rearward direction, whereby the report from the gun may assume the proportions of a concussion with deafening results to the ears of the shooter and bystanders. The side blast of such known muzzle brakes is, therefore, in some cases, extremely objectionable, and may materially interfere with the performance or ability of the operator of the gun and others stationed near him to shoot accurately, when constantly subjected to such ear splitting noises from the guns of the marksmen.

It is therefore an object of the present invention to provide a muzzle brake in which all of the major objectionable features now commonly inherent in known muzzle brakes have been substantially eliminated, whereby two or more persons may be stationed alongside one another and fire at a target without interference from the blasts of the guns of their adjacent neighbors.

A further and more specific object of the invention is to provide a muzzle brake comprising a cylindrical housing having means at one end for attaching it to a gun barrel, and means being provided in said housing for forming a plurality of longitudinally extending, closely spaced passages, into which the expanding gases from the charge may enter and pass to the end of said housing for discharge to the atmosphere and means also being provided whereby some of the gases entering said passages may discharge laterally from the brake housing to the atmosphere.

A further object is to provide a muzzle brake comprising a plurality longitudinally extending spaced parallel wall surface cooperating to provide a plurality of longitudinal undulating passages adapted to receive the expanding gases from the gun blast, and through which said gases may pass along zig-zag paths, thereby to reduce the recoil action of the gun and at the same time minimize the noise resulting from the gun blast.

A further and more specific object of the invention is to provide a muzzle brake comprising an outer shell or housing having a plurality of narrow elongated elements disposed therein longitudinally of the housing, and each having one edge seated against the inner wall surface of said shell, said elements being annularly spaced equi-distant apart within the shell and having means for retaining them in fixed position therein, said elements being transversely corrugated whereby when said elements are assembled in said shell, they cooperate to provide a plurality of elongated contiguous undulating passages extending lengthwise through the muzzle brake and having their inner edges spaced apart to permit portions of the burning gases to expand into said elongated passages and alternately impinge against the corrugated wall surfaces of said elements, said corrugations causing the gases to follow a plurality of zig-zag or undulating paths extending substantially throughout the length of the housing, whereby they exert a forward thrust or force on the gun to reduce the recoil pressure of force exerted against the marksman's shoulder.

A further and more specific object of the invention is to provide a muzzle brake comprising an outer enclosing shell having means at one end for securing it to a gun barrel, and a plurality of elongated elements being disposed within said shell in annularly spaced fixed relation and cooperating to provide a plurality of narrow elongated passages, and the opposed walls of said elements being transversely corrugated or grooved to provide a plurality of longitudinally spaced oppositely disposed inclined wall surfaces against which the burning gases alternately impinge as they travel through said passages, and whereby the expanding gases are caused to follow a plurality of longitudinally extending narrow undulating or zig-zag paths whereby the expanding forwardly directed gases impart a forward thrust of force to the gun barrel which materially reduces the recoil pressure or force of the gun against the marksman's shoulder and simultaneously minimizes side noise resulting from the gun blast.

A further object is to provide a muzzle brake comprising an outer supporting shell having a plurality of like elements disposed therein in fixed relation relative to one another and having means thereon providing a plurality of oppositely disposed inclined wall surfaces which cooperate to provide a plurality of undulating gas passages which completely surround the central bore of the device through which the charge from the gun passes to the atmosphere, said passages being in direct connection with said central bore whereby the burning gases expand into said passages and thereby effect a reduction in the recoil force of the gun with a resultant minimizing of side noise.

A further object of the invention is to provide a muzzle brake of the class described, comprising an outer supporting shell or housing having a plurality of disk-like elements nested together therein and cooperating to provide a plurality of elongated undulating gas passages extending lengthwise through the brake, and into which the expanding gases from each gun blast or shot may expand and thereby effect a reduction in the recoil pressure of the gun, and also a marked reduction in the noise usually resulting from the gun blast, particularly side noise.

A further object is to provide a muzzle brake comprising an enlarged outer supporting shell or housing having means at one end for securing it to a gun barrel, and a plurality of disk-like elements being fixedly secured in said housing in abutting flatwise relation, each of said elements comprising a plurality of radial fins or blades disposed at an angle to the axis thereof, and the angle of the fins or blades of adjacent elements being oppositely disposed whereby when said elements are stacked together in said housing, the fins or blades of said elements cooperate to provide, in effect, a plurality of narrow elongated undulating passages which are in direct communication with the axial bore in the brake, and into which portions of the burning gases may expand to neutralize the recoil force of the gun blast against the marksman's shoulder.

A further object is to provide a device of the class described comprising a cylindrical housing having means for attaching it to a gun barrel, and a plurality of pins being secured to the wall of said housing and extending radially inwardly therefrom in closely spaced relation with their inner ends co-operating to define an axial bore for the passage of the gun blast or charge through said housing, said pins being disposed in staggered relation whereby the expanding gases from the gun blast will impinge thereagainst and materially reduce the recoil of the gun and the side noise thereof.

Other objects of the invention reside in the simple and inexpensive construction of the device, whereby it readily lends itself for manufacture in quantity production at relatively low cost; in the provision of such a device comprising an outer supporting shell having a plurality of closely spaced elements fixed therein and co-operating to provide a plurality of longitudinally extending gas passages through which portions of the expanding gases from the gun blast may pass to the atmosphere, said elements being removably retained in the supporting shell whereby should the device accumulate carbon deposits from long periods of firing, said elements may readily be removed from the supporting shell for cleaning, and the like.

These and other objects of the invention and the means for their attainment will be more apparent from the following description, taken in connection with the accompanying drawings.

In the accompanying drawings there has been disclosed a plurality of structures designed to carry out the various objects of the invention, but it is to be understood that the invention is not confined to the exact features shown, as various changes may be made within the scope of the claims which follow.

In the drawings:

Figure 1 is a longitudinal sectional view of the novel muzzle brake herein disclosed, showing the arrangement of the longitudinally extending annularly spaced elements therein;

Figure 2 is a cross-sectional view on the line 2—2 of Figure 1, showing the annular arrangement of the longitudinally extending elements within the supporting shell, whereby a plurality of longitudinally extending gas-receiving passages are provided within the muzzle brake;

Figure 3 is an enlarged fragmentary view showing the means for spacing apart adjacent elements at one end of the device;

Figure 4 is a perspective view showing only the retaining nut for securing the longitudinally extending elements in position within the outer shell;

Figure 5 is an outer edge view of one of the elongated elements removed from the supporting shell and showing the means provided at the ends thereof for annularly spacing apart said elements within the supporting shell, and also indicating on dotted lines the undulating passages provided between adjacent elements;

Figure 6 is a view similar to Figure 5, but looking at the element from its opposite or inner edge;

Figure 7 is a perspective view showing the supporting shell only;

Figure 8 is an end view of one of the corrugated elements shown in Figures 5 and 6;

Figure 18:
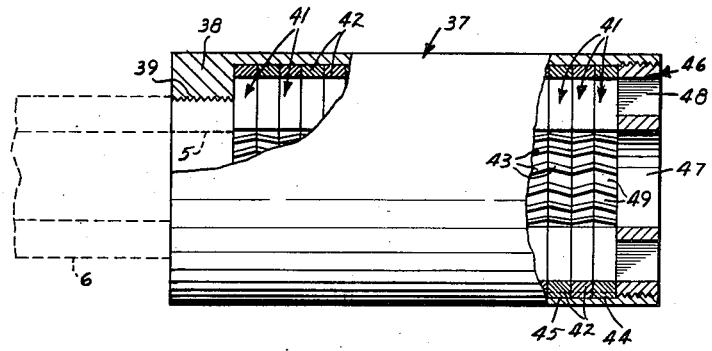
Figure 19:
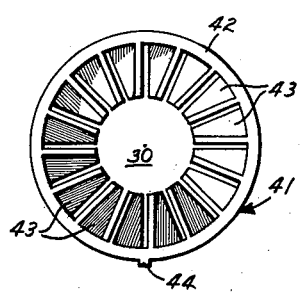
Figure 20:
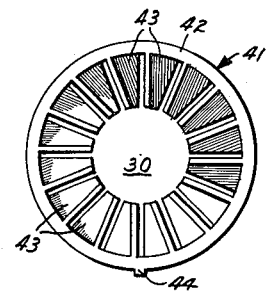
Figure 21:
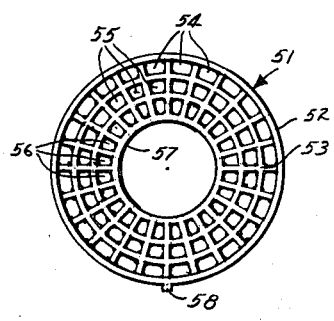
Figure 22:
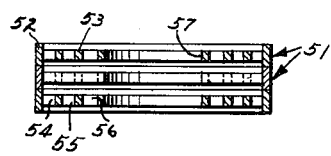
Figure 26:
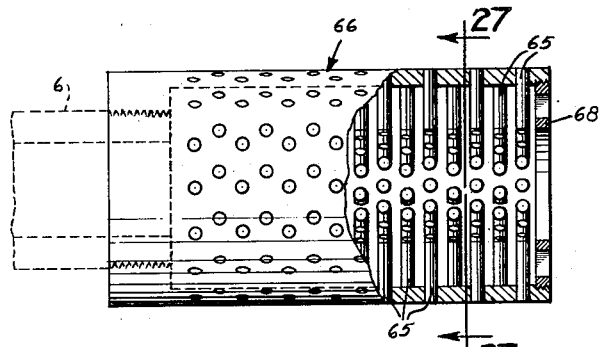
Figure 27:
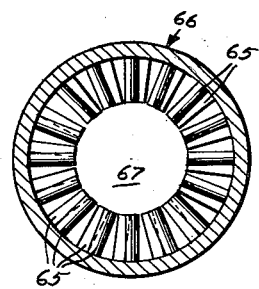
Figure 23:
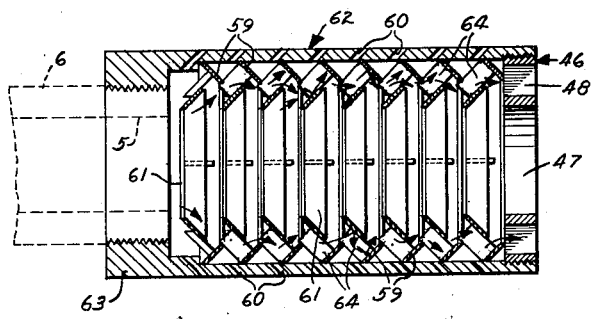
Figure 24:
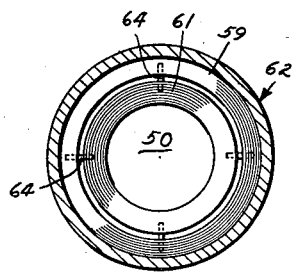
Figure 25:
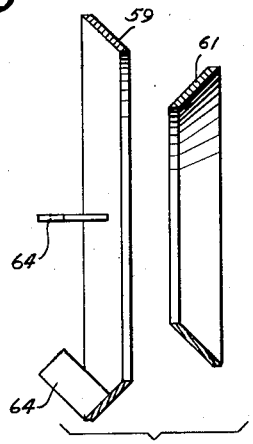

Figure 18 is a view illustrating another form wherein the means provided within the supporting shell for reducing the recoil of the gun and minimizing noise consists of a plurality of disk-like elements arranged in flatwise relation and having means embodied therein co-operating to provide a plurality of longitudinally extending undulating passages through the brake, into which portions of the burning gases of the gun blast expand, when the gun is fired;

Figure 19 is an end view of one of the disks illustrated in Figure 18, showing it detached from its supporting shell and also illustrating the radial fins or blades thereof;

Figure 20 is a view similar to Figure 19, but showing a disk having its radial fins or blades oppositely disposed with respect to the fins or blades of the disk shown on Figure 19;

Figure 21 is a view showing a disk of slightly modified construction;

Figure 22 is a view in cross-section, showing a plurality of disks such as illustrated in Figure 21, arranged in abutting engagement;

Figure 23 illustrates another modification wherein the recoil reducing and sound minimizing elements are in the form of frusto-conical disks alternately arranged within the outer supporting shell to provide a plurality of longitudinally extending undulating paths for the expanding gases, and whereby the gases follow an in-and-out course in their passage through the device;

Figure 24 is an end view of Figure 23;

Figure 25 is an enlarged fragmentary view illustrating a pair of the dual frusto-conical elements shown in Figure 23;

Figure 26 is a view similar to Figure 23, but illustrating still another construction wherein the recoil reducing and sound minimizing means is in the form of a plurality of radial pins having their outer ends secured in the wall of the supporting shell and spaced apart longitudinally and radially to provide a plurality of gas passages therebetween; and Figure 27 is a cross-sectional view on the line 27—27 of Figure 26.

The novel recoil neutralizing and noise minimizing device herein disclosed, and particularly as illustrated in Figures 1 to 8, inclusive, comprises an outer supporting shell or housing, generally designated by the numeral 2, having an end wall 3 shown provided with a threaded bore 4 adapted to receive the exteriorly threaded terminal 5 of the gun barrel 6, indicated in dotted lines in Figure 1. By thus securing the muzzle brake to the gun barrel, it provides, in effect, a continuation thereof, and may readily be detached therefrom when desired. The end wall 3 has a bore 7 therein axially aligned with the bore in the gun barrel, and permits uninterrupted passage of the charge from the gun barrel into and through the muzzle brake.

An important feature of the present invention resides in the novel means provided within the shell or housing 2 for reducing the recoil of the gun, and simultaneously minimizing the report or noise of the charge as it leaves the gun barrel. To thus effect reduction in the recoil force of the gun, a plurality of elongated elements, generally designated by the numeral 8, are provided within the shell 2 and are annularly spaced apart around the interior wall of the shell, as best illustrated in Figure 2.

The elements 8 are identical in construction, and each is provided at one end with a laterally disposed spacing lug 9, and a spacing lug 11 is also provided at the opposite end of each element 8. The lugs 11, however, are preferably secured to the outer edges of their respective elements 8, and may be slightly curved to fit the interior surface of the shell 2, as will be understod by referring to Figure 2. In other words, the lugs 11 co-operate to annularly space apart the outer ends of the elements 8, whereas the lugs 9 space apart the inner ends thereof, as indicated in Figure 5.

The elongated elements 8, as illustrated in Figures 2, 3, 5, 6 and 8, are preferably triangular in cross-section, whereby the adjacent faces of adjacent elements are disposed in substantially parallel relation, so that the widths of the longitudinally extending passages between adjacent elements are the same adjacent to the wall of the shell 2 as they are at the inner edges of said elements, as is clearly illustrated in Figure 2.

Another feature of the invention resides in the unique construction and arrangement of the elongated elements 8 within the supporting shell or housing 2. By reference to Figures 1, 5 and 6, it will be noted that said elements are transversely corrugated or grooved. By thus transversely corrugating or grooving the elements 8, when said elements are assembled in the shell 2, as illustrated in Figures 1 and 2, their opposed side surfaces co-operate to provide a plurality of elongated undulating passages 12, which extend from the end wall 3 of the supporting shell to the discharge end of the device, as illustrated in Figure 1.

The spacing between adjacent elements 8 and the arrangement of the corrugations thereof are such that the high points 13 of the corrugations of adjacent elements are laterally spaced apart to provide narrow unobstructed passages, indicated between the spaced parallel broken lines 14—14 in Figure 5, which are in direct communication with the central bore 10, of the nozzle brake, defined by the inner annularly spaced edges of the corrugated elements 8, as best shown in Figure 2.

The corrugated elements 8 are removably retained in the shell 2 by means of an annular nut 15, received in threaded engagement with the discharge end of the shell 2, as clearly illustrated in Figure 1. By reference to this figure, it will also be noted that the inner face of the end wall 3 at the opposite end of the shell has an annular groove 16 therein adapted to receive the spacing lugs 9 at the ends 17 of the elements 8, as will be understood by reference to Figure 1. The ends 17 of the elements 8 are also notched, as indicated at 18, thereby to reduce the widths of the element terminals 17 to correspond substantially to the width of the retaining groove 16.

The opposite end or terminal 19 of each element 8 is shown provided with a beveled face or edge 21 adapted to be engaged by the conical inner end 22 of the locking nut 15, as shown at the right hand end of Figure 1. By thus constructing the ends 19 of the elements 8 and the inner end 22 of the locking nut 15, the elements 8 are forced inwardly and outwardly against the wall of the shell 2, when the nut 15 is screwed into the end of the shell, as will readily be understood by reference to Figure 1. The spacing lugs 9 and 11 thus co-operate to annularly uniformly space the elements 8 from one another around the inner circumference of the shell, as best illustrated in Figure 2.

In the operation of the novel device illustrated in Figures 1 to 8, inclusive, when the gun is discharged, the gases from the charge expand into the narrow elongated passages 12 provided between adjacent elements 8, and are projected forwardly therethrough by the force of the blast. The passages 12 are open to the atmosphere at the discharge end of the device through a plurality of arcuately formed openings or passages 23, provided in the locking nut 15, as clearly illustrated in Figures 1 and 4. As the gases pass through the elongated undulating passages 12, they are continuously deflected from side to side of said passages because of the transverse corrugations provided in the walls of said elements, as indicated by the arrows in Figure 5.

By thus continually deflecting or "bouncing" the gases from one corrugation to another of said elements, causes the gases to follow a plurality of undulating or zig-zag paths as it passes through the device, whereby the gases exert a forward thrust or force against the inclined faces of said corrugations which imparts a definite opposing force against the recoil of the gun blast or charge, which greatly reduces the recoil presure or impact of the gun blast against the shooter's shoulder, each time he fires the gun, whereby the accuracy of his firing is not likely to be affected by the recoil of the gun, as is now quite common, when utilizing devices such as are now available.

To partially relieve the gas pressure in the narrow undulating passages 12 defined by the elements 8, a plurality of small apertures 24 may be provided in the wall of the shell 2, as indicated in Figures 1 and 7. These apertures are so arranged in the shell that their inner ends are in direct communication with the passages 12, whereby portions of the expanding gases may escape laterally from the brake to the atmosphere, as will be understood by referring to Figures 1 and 2. The apertures 24 are preferably disposed at a slight forward angle to direct the gases in a forwardly direction, away from the shooter, thereby to minimize the transmission of noise to the shooter and bystanders stationed adjacent to the gun when fired.

Figures 9 to 17, inclusive, illustrate a muzzle brake of slightly different construction from the one shown in the previous figures, which comprises a shell 25 having an end wall 3 similar to the one shown in Figure 1, which has a similar threaded bore 4 for receiving the threaded terminal of the gun barrel 6, as indicated. The form illustrated in Figure 9 comprises a plurality of narrow elongated transversely corrugated elements 26, each provided at one end with a spacing lug 27, and at its opposite end with a laterally extending lug 28 adapted to be received in the spaced slots 29 of a spacing collar 31, shown in Figures 9 and 12.

The corrugated elements 26, shown in Figures 9 to 16, inclusive, may readily be made of flat ribbon stock, transversely corrugated by suitable forming dies as is well known in the trade. By forming the elements 26 of flat stock, the passages 32 provided between adjacent elements are wider adjacent to the wall of the shell 25 than at their inner edges, as clearly illustrated in Figure 10. The inner edges of the elements 26 co-operate to provide an axial bore 20 which extends lengthwise through the device as will be understood by reference to Figures 9 and 10.

Figure 11:
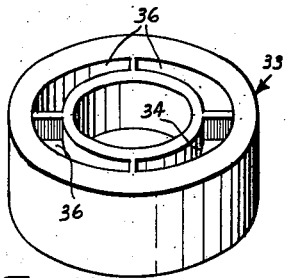
Figure 11 is a perspective view of the retaining cap or nut for securing the annularly spaced elements in position within the supporting shell.
Figure 12:
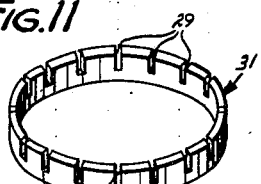
Figure 12 is a perspective view showing the spacing ring utilized for annularly spacing apart the longitudinal elements within the supporting shell.
Figure 13:
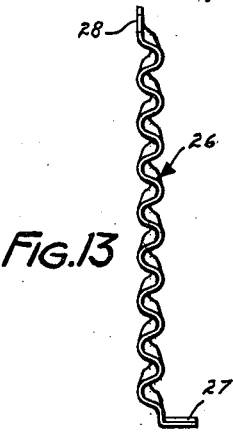
Figure 13 is a perspective view showing one of the longitudinally extending elements removed from the supporting shell, and also showing the means providing at one end thereof for spacing said elements apart.
Figure 9:
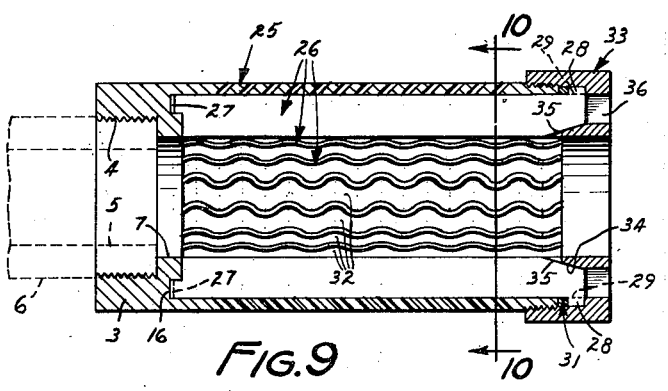
Figure 9 is a view similar to Figure 1, showing a slightly modified construction.
Figure 14:
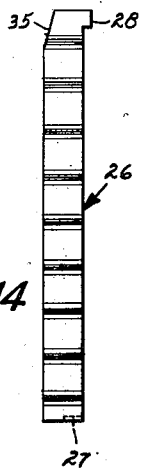
Figure 14 is a side view of Figure 13.
Figure 10:
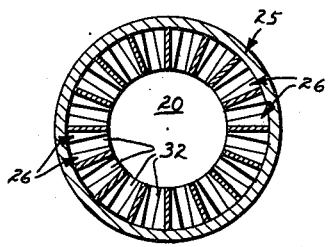
Figure 10 is a cross-sectional view on the line 10—10 of Figure 9.
Figure 17:
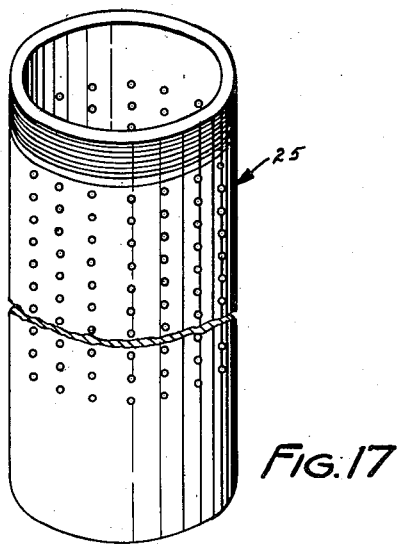
Figure 17 is a perspective view of the outer supporting shell shown in Figure 9.

To secure the elongated elements 26 in position in the shell 25, an interiorly threaded lock nut 33 is received in threaded engagement with the discharge end of the shell as shown in Figure 9. Before the locking nut 33 is engaged with the shell 25, the elongated elements 26 are inserted into the shell from the discharge end thereof, whereby their reduced terminals or lugs 27 are seated in the annular groove 16 in the end wall 3 of the supporting shell or housing 25.

The lock nut 33 may then be engaged with the end of the shell as shown in Figure 1, it being understood that the spacing collar 31 is first inserted into the open end of the shell and into engagement with the outwardly extending lugs 28 of the corrugated elements 26. The lock nut may then be driven home by relative rotation thereof, whereupon the conical end 34 of the lock nut will engage the inner beveled faces 35 of the adjacent ends of the elements 26, and thus force the opposite ends of said elements firmly against the end wall 3 of the shell, as in Figure 1. At the same time the opposite ends of the elements 26 are forced outwardly against the wall of the shell by rotation of the locking nut 33. The locking nut has a plurality of discharge openings 36 therein, through which a portion of the expanding gases may discharge directly to the atmosphere, as will be understood.

Figure 16:
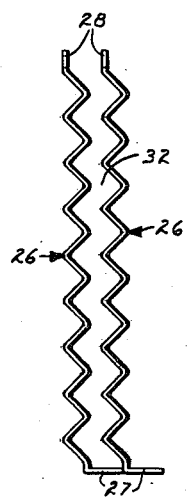
Figure 16 is a view similar to Figure 15, showing a slightly modified construction.
Figure 15:
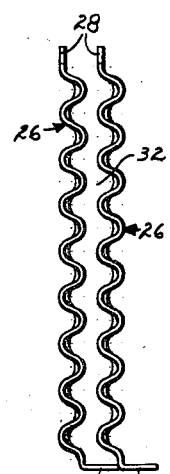
Figure 15 is a fragmentary view showing the undulating paths provided between adjacent elements, resulting from the transverse corrugations provided therein.

The transverse corrugations of the elongated elements 26 are preferably formed as illustrated in Figure 15, wherein it will be noted that the corrugations are relatively larger at the outer edges of said elements than they are at the inner edges thereof, whereby the high points 13 of adjacent elements 26 uniformly spaced apart from the inner edges of said elements to the outer edges thereof. They may, however, be shaped as indicated in Figure 16, if desired, in which case the spacing between the corrugations of adjacent elements 26 will be relatively greater than the spacing of said corrugations at the inner edges of said elements. It is to be understood, however, that the ultimate results obtained by the use of either form will be very similar.

In Figures 18, 19 and 20 there is illustrated another form wherein the muzzle brake comprises a tubular member or shell 37 having an end wall 38 provided with a threaded bore 39 for receiving the threaded terminal of the gun barrel 6, as indicated. The means provided within the shell 37 for reducing the recoil of the gun and minimizing noise is shown comprising a plurality of disk-like elements, generally designated by the numeral 41. Each element comprises an outer annular portion 42 adapted to be slidably fitted into the bore of the shell 37, as will be understood by reference to Figure 18.

Secured to and projecting inwardly from the annular band or portion 42 of each disk-like element 41, are a plurality of annularly spaced inclined lugs or vanes 43, which are angularly disposed with reference to the axis of the disk. The disks are made right and left hand so that when nested together within the shell in alternate relation, as indicated in Figure 18, the inwardly projecting lugs or vanes of said disks co-operate to provide a plurality of closely spaced elongated undulating passages into which the exhaust gases expand from the central bore or passage 30 of the device, when the gun is fired, as in the devices disclosed in the previous figures.

A small lug 44 is provided on the periphery of each disk-like element 41 adapted to be received in a longitudinally extending keyway 45 provided in the wall of the tubular member 37. The peripheral lugs 44 on the disks 41 lock said disks against relative rotation within the housing or shell 37, whereby a plurality of narrow elongated undulating passages 49 are provided by the inwardly projecting blades or vanes 43 of the disks 41, as will be understood by reference to Figure 18.

When the disks 41 have been inserted into the supporting shell 37, a locking nut, generally designated by the numeral 46, is received in threaded engagement with the interiorly threaded discharge end of the shell 37 to firmly secure the disks in position in the shell and thus complete formation of the device. The lock nut 46 has a central bore 47 axially aligned with the bore of the gun barrel. It also has a plurality of arcuately formed passages 48 therein through which the gases may escape to the atmosphere from the narrow elongated undulating passages 49 provided by the lugs 43 of the disks 41. When the parts are assembled as shown in Figure 18, the operation and function of the composite device is substantially the same as obtained with the use of the devices shown in Figures 1 and 9.

In Figures 21 and 22 there is illustrated a construction wherein the recoil reducing and noise minimizing means of the brake is in the form of a plurality of circular disk-like grids, generally designated by the numeral 51. Each disk comprises an outer annular band or member 52 adapted to be slidably fitted into the bore of the supporting shell 37 of the brake. Secured to each annular disk member 52 is a relatively thin wall member 53 which is centrally located therein, as illustrated in Figure 22. The wall member 53 of each disk has a plurality of closely spaced apertures 54, 55 and 56 therein, and an enlarged central bore or opening 57.

Each disk 51 also has a locating lug 58 which is differently arranged on alternate disks so that when the disks are inserted into the shell 37, the apertures of one disk will be disposed in staggered relation to the apertures of a succeeding disk, and so on throughout the length of the composite brake. The disks 51 are secured in position in the shell by a lock nut 46, similar to the one shown in Figure 18.

When the disks 51, illustrated in Figures 21 and 22, are stacked together within the supporting shell 37, it will be noted by referring to Figure 22, that a series of circular flat chambers are provided between adjacent disks throughout the length of the device. These chambers are open to the bore 57 so that the gases from the charge or blast may expand into said chambers, from whence the gases may pass from one chamber to another through the apertures 54, 55 and 56 in the disks, until they finally are exhausted to the atmosphere through the arcuately formed passages 48 in the lock nut 46.

It must be noted from the foregoing that the exhaust gases passing through a muzzle brake equipped with grids 51 such as illustrated in Figures 21 and 22, will follow a multiplicity of undulating or zig-zag passages, as they travel through the device, with a resultant reduction in the recoil force or action of the gun, and a definite minimizing of the noise caused by the firing of the gun.

Figures 23, 24 and 25 illustrate another form wherein a plurality of annular frusto-conical elements 59 and 61 are nested together within a supporting shell 62 and secured therein by a lock nut 46, similar to the one shown in Figure 18. The housing has an end wall 63 which is interiorly threaded to receive the end of the gun barrel, as indicated by the dotted lines. The frusto-conical elements 59 and 61 are of different diameters, are best illustrated in Figure 25, and the relatively larger disk 59 is shown provided with a plurality of inwardly projecting plate-like elements 64 which co-operate to provide a seat for the relatively small frusto-conical element 61 when the parts are assembled, as shown in Figure 23. The central openings or apertures in the smaller frusto-conical elements 61 co-operate to provide an axial bore 50 through the device, where the elements 59 and 61 are secured in position within the shell or housing 62, as shown in Figure 24.

The elements 59 and 61 are nested together within the supporting shell 62 in opposed relation and secured in position therein by the nut 46. They are axially spaced apart by the plate-like elements 64 to permit the burning gases to expand outwardly between said elements and into the areas surrounding them. Thus the expanding gases will impinge against the inner surfaces of the relatively larger frusto-conical elements 59, which in turn reverse the flow of the gases against the exterior surfaces of the smaller inner elements 61, as indicated by the arrows in Figure 23. By thus alternately directing the high velocity gases against the frusto-conical elements 59 and 61, as above described, and as indicated by the arrows in Figure 23, a forward force or thrust is exerted against said elements which is transmitted to the gun barrel with a marked reduction in the recoil of the gun, as well as in the usual report or noise developed thereby. If desired, a plurality of gas discharge apertures 60 may be provided in the wall of the cylindrical housing 62.

In Figures 26 and 27 there is illustrated still another form wherein the recoil reducing and sound minimizing means is in the form of a plurality of inwardly projecting pins or pegs 65, having their outer ends suitably fixed in the wall of the supporting shell 66. The pins 65 are arranged in staggered relation in the wall of the supporting shell 66, and have their inner ends co-operating to provide a bore 67 which is axially aligned with the bore of the gun barrel.

In the form illustrated in Figures 26 and 27 the pins 65 co-operate to provide a plurality of undulating gas passages through the device which, as in the structures illustrated in the previous figures, causes the expanding gases to impart a forward force or thrust against the multiple pins 65, as the gases travel through the brake, with the resultant reduction in the recoil of the gun and a definite minimizing of the noise produced by the firing of the gun. A perforated disk or lock nut 68 is shown received in threaded engagement with the discharge end of the supporting shell 66, to provide a protection for the pins 65 at the discharge end of the device.

The novel recoil neutralizer herein disclosed has been found extremely efficient and practical in actual use. It is very compact and may readily be attached to a gun barrel as indicated in the drawings, whereby it becomes, in effect, an integral part thereof, while in use. By constructing the interior of the cylindrical shell or housing of the device in such a manner as to provide a plurality of longitudinally extending narrow undulating passages around the "bore" of the device, which passages are in direct communication with said "bore," the expanding gas freely enters into said undulating passages and passes therethrough to the atmosphere from the discharge end of the device. As the expanding gas passes in a forward direction, it is constantly directed against the inclined side wall surfaces defining said passages, which causes it to follow a zig-zag course, as indicated by the arrows in Figure 5. Such impinging of the gases against the inclined wall surfaces of the passages 12 imparts a forward thrust or force against the device and the gun barrel attached thereto, which greatly reduces the recoil of the gun, whereby the marksman may fire the gun with utmost comfort and with the assurance that his accuracy will not be impaired because of the recoil of the gun.

The device is particularly well adapted for use on small fire arms. When utilized on a rifle, the wall of the cylindrical supporting shell or housing may be perforated, as shown in the application drawings, thereby to permit a portion of the expanding gases to discharge laterally from the device to the atmosphere, but in a forward direction. When properly perforated, maximum neutralizing effect is obtained, and also a marked reduction in the noise developed by the gun.

The various structures illustrated in the application drawings operate in substantially the same manner. Each, it will be noted, has means embodied therein for causing the expanding gases to follow undulating zig-zag paths through the cylindrical housing of the device, which passages are disposed in closely spaced relation around the central "bore" of the device, as clearly illustrated in Figures 2 and 10. The composite device in its various forms, when assembled for mounting on a gun barrel, has no moving parts which is a highly desirable feature in a device of this general type.

Should the recoil neutralizing elements within the cylindrical housing of the device accumulate carbon deposits, and the like, with the resultant obstruction, or partial obstruction, of the longitudinally extending passages therethrough, such elements may readily be removed from their supporting housing by the simple detachment of the lock nut provided at the outer end of the recoil neutralizer housing, whereupon all of the interior parts of the device are freed for convenient removal for cleaning or other purposes.

The foregoing detailed description has been given for clearness of understanding only, and no unnecessary limitations should be understood therefrom, but the appended claims should be construed as broadly as permissible in view of the prior art.

I claim as my invention:

1. An anti-recoil device comprising a cylindrical housing having means at its inner end for attaching it to a gun barrel, a plurality of elongated elements fitted into said housing in circumferentially spaced fixed relation and cooperating to provide an axial bore in said housing, said elements also cooperating to provide a plurality of longitudinally extending narrow elongated undulating passages which surround the axial bore in said housing and are in direct communication with said central bore the length thereof, thereby to permit the expanding gases to enter said passages and travel forwardly therethrough to the atmosphere along undulating paths, and whereby the forward movement of the expanding gases will impart a forward thrust or force to the gun barrel to neutralize the recoil of the gun and minimize noise.

2. An anti-recoil device according to claim 1, wherein the wall of the cylindrical housing has a plurality of apertures therein through which portions of the expanding gases may discharge to the atmosphere.

3. An anti-recoil device according to claim 2, wherein the apertures in the wall of the housing are disposed at an incline to the axis thereof, thereby to forwardly direct the gases discharging therefrom.

4. An anti-recoil device according to claim 1, wherein each of said elements comprises a plurality of inclined wall surfaces which constitute the opposed side walls of said narrow elongated passages, and against which inclined wall surfaces the expanding gases from the gun blast alternately impinge in their passage to the atmosphere, thereby to impart a forward thrust to the gun barrel to neutralize the recoil of the gun.

5. An anti-recoil device comprising a cylindrical housing having means at one end for attaching it to a gun barrel and having an annular seat adjacent to said end, a plurality of elongated elements fitted into said housing with their inner ends engaged with said seat, means engageable with the opposite end of the housing for retaining said elements therein in fixed space relation, and said elements being transversely corrugated whereby the wall surfaces of adjacent elements co-operate to provide a plurality of longitudinally extending narrow undulating gas passages through which the expanding gases from each gun blast must flow to the atmosphere, and whereby a forward force is imparted to the gun to neutralize the recoil thereof.

6. An anti-recoil device according to claim 5, wherein the opposed wall surfaces of said elongated elements are radially disposed so that the wall surfaces defining each undulating gas passage are disposed in parallel relation substantially the lengths of said housing.

7. An anti-recoil device comprising a housing having means at one end for attaching it to a gun barrel and having an annular seat adjacent to said end, a plurality of elongated elements fitted into said housing with their inner ends engaged with said seat, means carried by said elements for annularly spacing them apart within the housing to provide a plurality of narrow elongated gas passages, means engageable with the opposite end of the housing for retaining said elements in fixed relation therein, said elements being transversely corrugated the length thereof whereby the opposite walls of said narrow elongated passages comprise a plurality of longitudinally spaced inclined wall surfaces against which the expanding gases passing through said passages alternately impinge in a forward direction, thereby neutralizing the recoil of the gun and simultaneously minimizing the noise thereof.

8. In a device of the class described, a cylindrical housing having means at its inner end for securing it to a gun barrel, an annular seat at said end of the housing, a plurality of elongated strap-like elements fitted into said housing with their inner ends engaged with said seat, means for annularly spacing apart said ends of said elements to provide a plurality of longitudinally extending passages therebetween, an annular spacing member engaged with the opposite ends of said elements, means received in threaded engagement with the outer end of said housing for fixedly securing said elongated elements therein, said elements being transversely corrugated and arranged with their corrugations annularly aligned whereby the gas passages provided therebetween are wavy or undulating in form so that the expanding gases entering said passages will follow a plurality of undulating or zig-zag paths through said device, thereby imparting a forward thrust to neutralize the recoil of the gun and minimize the noise thereof.

9. In a device according to claim 8, wherein all of said narrow elongated elements are identical in formation.

References Cited in the file of this patent

UNITED STATES PATENTS

| | | |
|---|---|---|
| 955,694 | Riggs | Apr. 19, 1910 |
| 1,017,003 | Kenney | Feb. 13, 1912 |
| 1,127,250 | Humm | Feb. 2, 1915 |
| 2,112,660 | Hudson | Mar. 29, 1938 |

FOREIGN PATENTS

| | | |
|---|---|---|
| 665,167 | Germany | Sept. 22, 1938 |
| 981,969 | France | Jan. 17, 1951 |